UNITED STATES PATENT OFFICE.

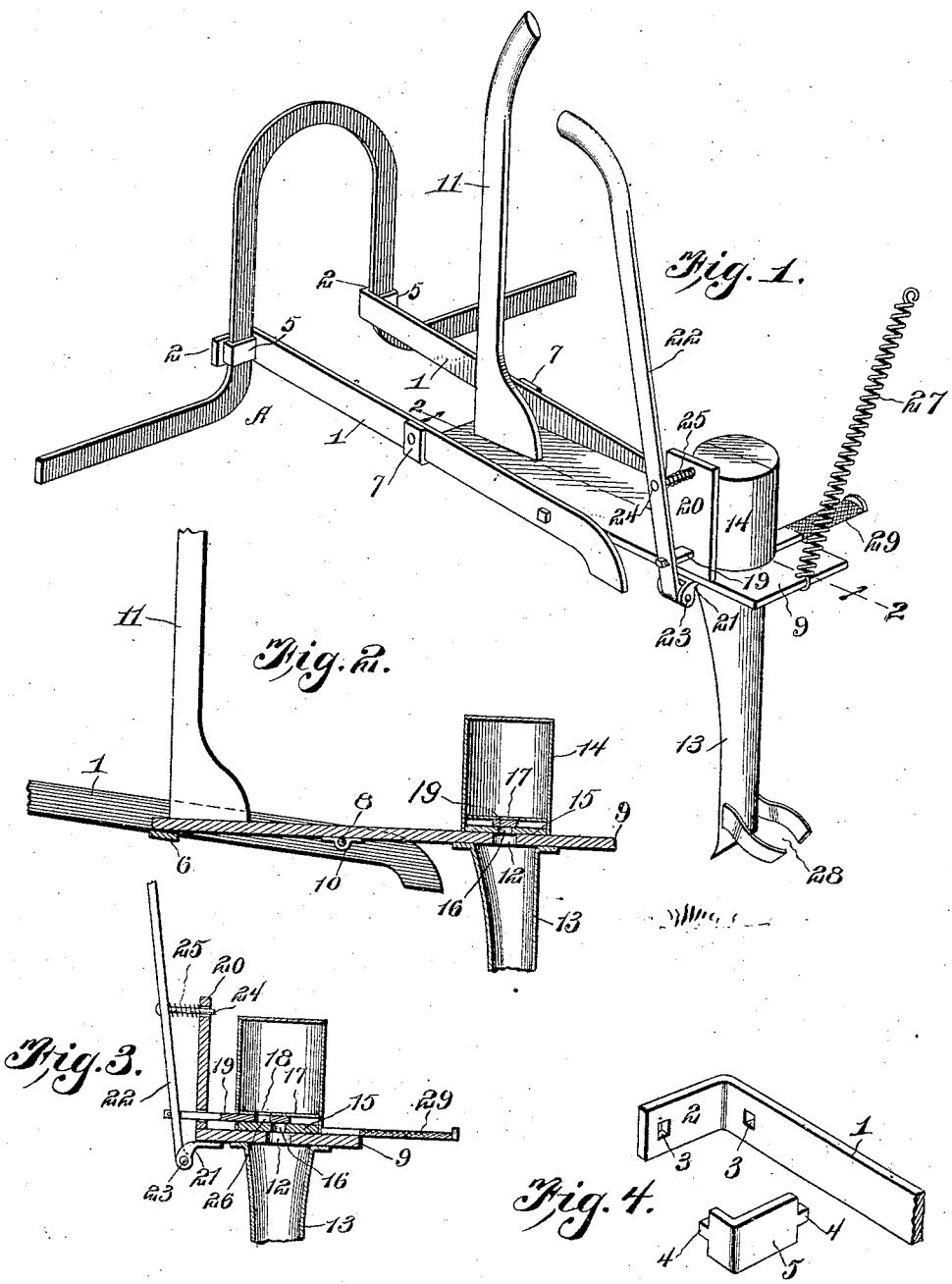

JOHN C. ATTERBURY AND CHARLES LA PLANT, OF MADISON, MISSOURI; SAID LA PLANT ASSIGNOR OF ONE-FOURTH TO JOSEPH W. BAKER, OF MONROE COUNTY, MISSOURI.

PLANTER.

No. 884,790.　　　Specification of Letters Patent.　　　Patented April 14, 1908.

Application filed July 26, 1907. Serial No. 385,650.

*To all whom it may concern:*

Be it known that we, JOHN C. ATTERBURY and CHARLES LA PLANT, citizens of the United States, residing at Madison, in the county of Monroe and State of Missouri, have invented new and useful Improvements in Planters, of which the following is a specification.

This invention is an improved replanting attachment for wheel cultivators to enable missing hills of corn or the like to be replanted while cultivating a field, and the said invention consists in the construction, combination and arrangement of devices hereinafter described and claimed.

In the accompanying drawings, Figure 1 is a perspective view of a replanting attachment constructed in accordance with our invention, showing the same attached to the arch bar of a disk cultivator machine. Fig. 2 is a detail sectional view taken on the plane indicated by the line 2—2 of Fig. 1. Fig. 3 is a vertical transverse sectional view of the same. Fig. 4 is a detail perspective view of the parts of one of the supporting bars of our replanting attachment.

In accordance with our invention we provide a pair of supporting bars 1 which are provided at their front ends with outturned portions 2 to bear against the front sides of the vertical arms of the usual arch bar A of a disk cultivator, the said supporting bars having openings 3 near the angles formed by the said out-turned portions 2 and near the shorter ends of said out-turned portions to receive lugs 4 at the ends of the angle clips 5 which bear against the rear sides of the arch bar, said angle clips coacting with the out-turned portions of said bars to secure the latter to the arch bar so that such supporting bars 1 project rearwardly beyond the arched portion of the bar as shown in Fig. 1. The said supporting bars 1 are connected together at a suitable distance from their front ends by a cross bar 6, the ends of which are upturned as at 7 and secured on the outer sides of said supporting bars. A bolt 8 connects the said supporting bars at a suitable distance from the rear ends thereof. The said bolt forms a pivotal support for a plate or body 9 of our improved replanting attachment, the front end of which plate or body is adapted to bear on the cross bar 6, said plate or body having clips 10 on its lower side which engage said bolt 8.

At the front end of the said plate or body and extending upwardly therefrom is a lever 11 which is disposed at a suitable distance in front of the seat of a cultivating machine so that it may be readily grasped by the driver to move such plate or body as may be required. The said plate or body is provided at a suitable distance from its rear end which projects rearwardly beyond the supporting bars 1, with an opening 12. A seed spout 13 has its upper end secured to the underside of the rear portion of said plate or body 9, below the opening 12. On said plate or body, over the seed spout, is a hopper 14 which has a bottom 15 provided with an opening 16 that registers with the opening 12. Said hopper is also provided with a false bottom plate 17 which is spaced above the bottom 15 and provided with an opening 18 which is out of line with the openings 12 and 16.

A reciprocating seed plate or bar 19 operates in the space between the bottom and false bottom plate of the hopper, extends through an opening in one side of the hopper and projects outwardly therefrom. The plate or body 9 is provided at one side at a point opposite the hopper with a vertical arm 20. The said seed plate or bar 19 extends through and operates in an opening in said vertical arm. On the under side of the plate or body 9 under said arm 20 is a fixed member or bracket 21 with which the lower end of a lever 22 is pivotally connected, as at 23. A bolt 24 which projects from the inner side of said lever 22 operates in an opening in the arm 20, and on the said bolt, between said arm and lever, is a coil extensile spring 25 which serves to throw the upper portion of the lever 22 outwardly to cause the latter to normally keep the seed plate or bar in position to keep its seed cup or opening 26 in register with the opening 18 so that such seed cup or opening 26 will be filled with grain. The driver seated upon the seat of the cultivating machine, which it will be understood will be higher than and somewhat in rear of the hopper, by moving one of his knees may operate the lever 22 when the seed spout reaches a missing hill to cause seeds to be planted in such missing hill as will be understood. The rear end of the plate or body 9 may be lowered to cause the lower end of the spout to enter the earth at the point or points where the hill or hills are to be replanted by means of the lever 11. When such lever is released a spring 27 which may connect the rear end of the plate or body 9 to the seat of the cultivator machine, elevates the rear end of such plate or body and hence raises the seed spout from the ground, such spring serving to normally hold the replanter in elevated inoperative position, as indicated in Fig. 1. The seed spout is provided near its lower end with suitable covering wings 28 to cover the seeds dropped therefrom into the missing hills.

In Figs. 1 and 3, we also indicate a stirrup 29 by means of which the driver may depress the replanter by means of one foot.

Our improved replanting attachment is adapted for use in connection with cultivating machines of different varieties having an arch bar and is cheap, simple, strong and durable and enables missing hills to be replanted while cultivating a field with a very slight exertion on the part of the driver.

Having thus described the invention, what we claim as new and desire to secure by Letters Patent is:—

1. A replanting attachment for cultivators comprising supporting bars having means whereby they may be attached to a cultivator element and a cross-bar connecting said supporting bars; a body pivotally mounted between said supporting bars, a spring to normally raise the rear end of the body and normally maintain the front portion thereof on said cross bar, means to enable the rear end of said body to be depressed against the tension of said spring, a seed spout and furrow opener depending from and a seed-dropping mechanism on the rear portion of said body, said seed-dropping mechanism having a longitudinally movable element, a vertical arm extending upwardly from and attached to one side of the rear portion of said body, and forming a guide for said movable element, an operating lever for said element, pivotally connected to said body, and a spring to move said lever and movable element in one direction and bearing between the said arm and the said lever.

2. A replanting attachment for cultivators comprising a pivotally mounted body, a seed-dropping mechanism thereon, a lever carried by and extending upwardly from the body, to operate the seed-dropping mechanism, a furrow opener and seed spout depending from the body, and means whereby said pivotally mounted body may be raised and lowered to raise and lower the seed-dropping mechanism and seed spout.

In testimony whereof, we affix our signatures in presence of two witnesses.

JOHN C. ATTERBURY.
CHARLES LA PLANT.

Witnesses:
   Jos. W. Baker,
   Joseph W. Atterbury, Jr.